Jan. 7, 1969    F. G. KRAFFT    3,420,473
POWERED AND STEERABLE LIGHTER-THAN-AIR VEHICLE
Filed April 11, 1966    Sheet 1 of 3
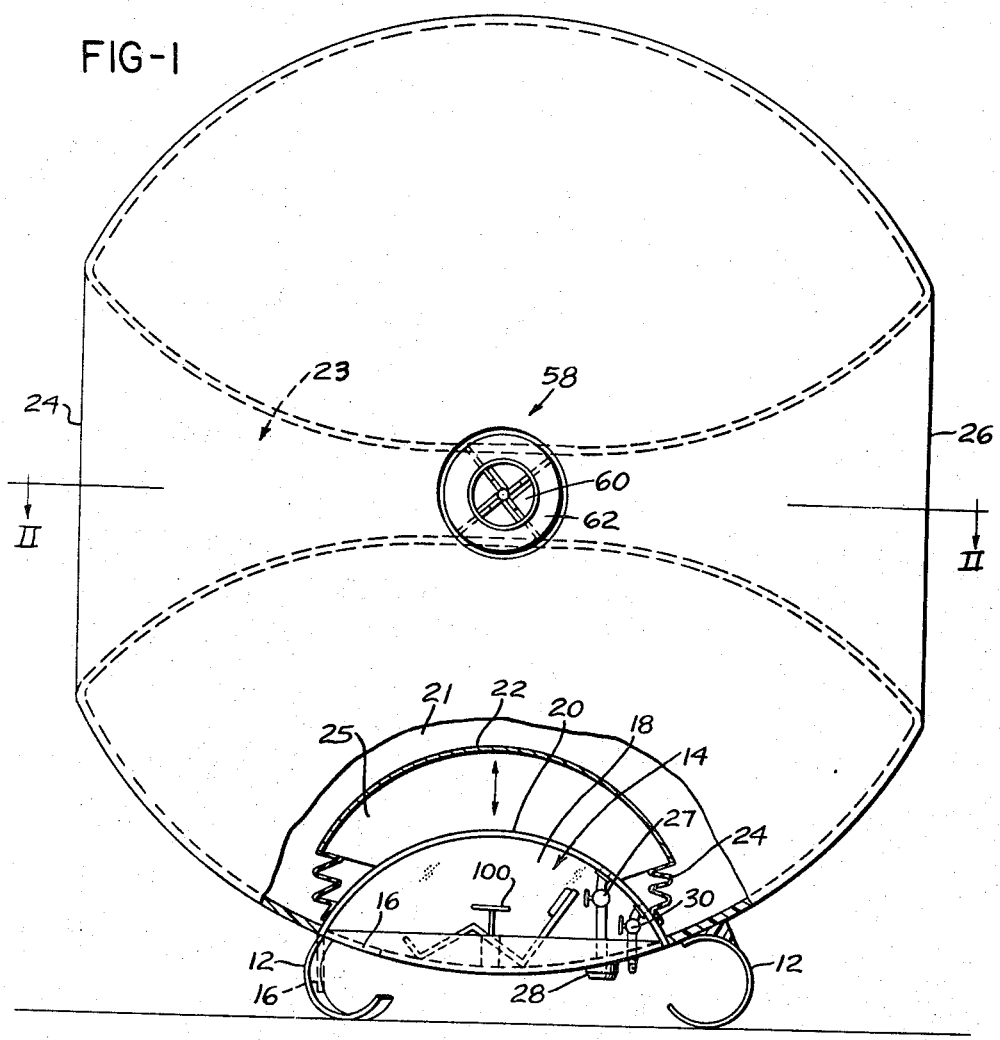
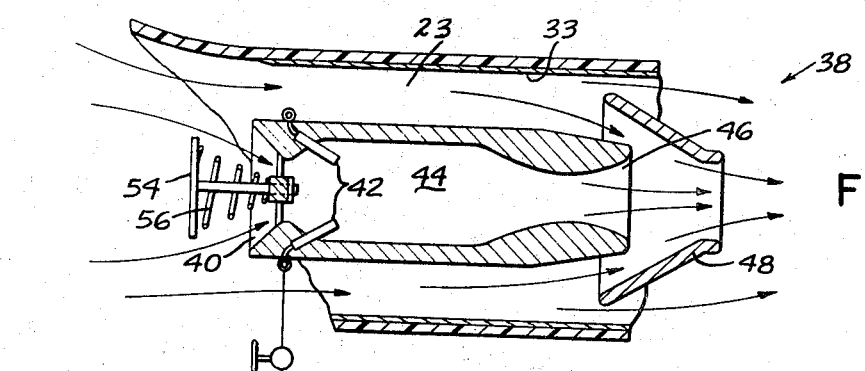
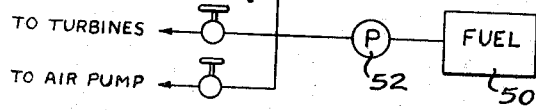
INVENTOR.
FREDERICK G. KRAFFT
BY

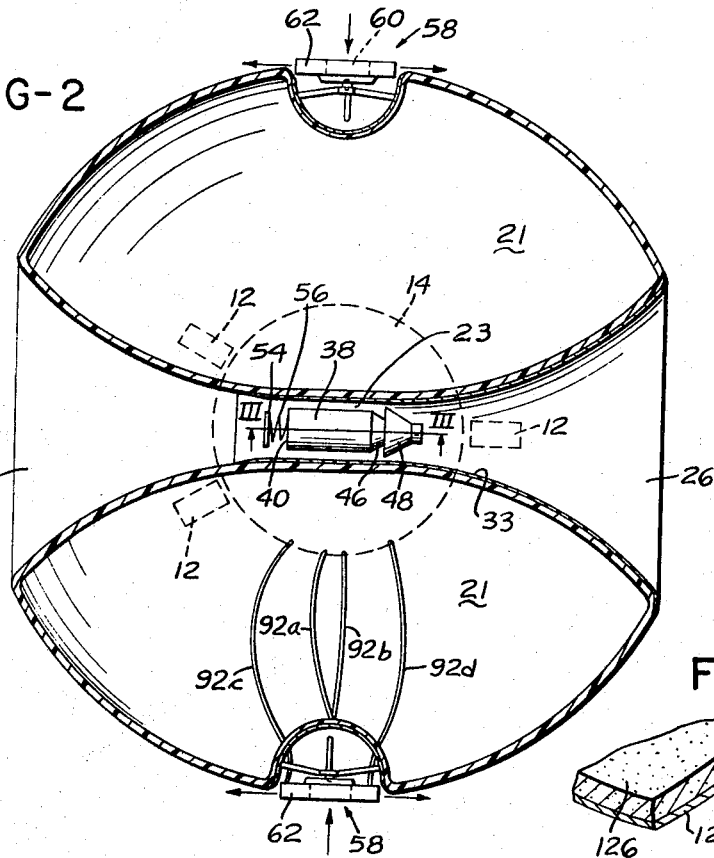
FIG-2
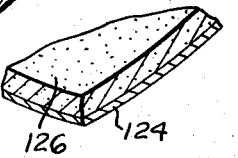
FIG-12
FIG-13
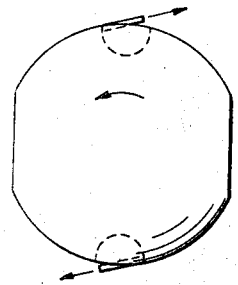
FIG-6
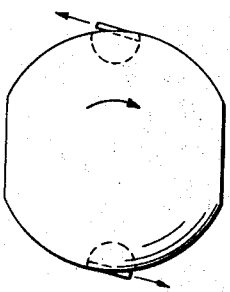
FIG-7
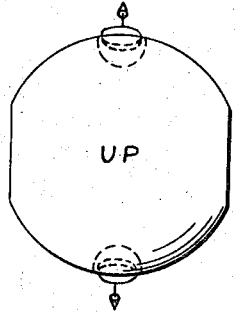
FIG-8
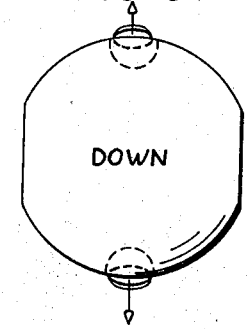
FIG-9
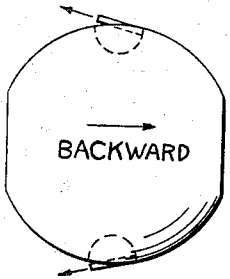
FIG-10
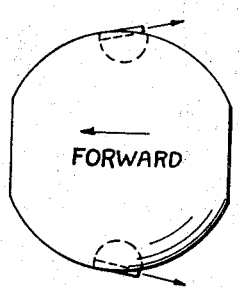
FIG-11
INVENTOR.
FREDERICK G. KRAFFT
BY Jan. 7, 1969   F. G. KRAFFT   3,420,473
POWERED AND STEERABLE LIGHTER-THAN-AIR VEHICLE
Filed April 11, 1966   Sheet 3 of 3
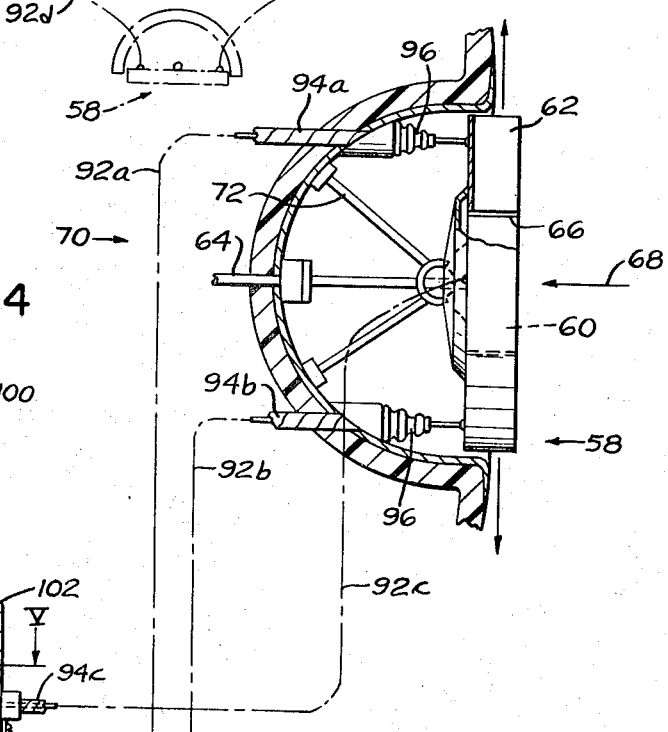
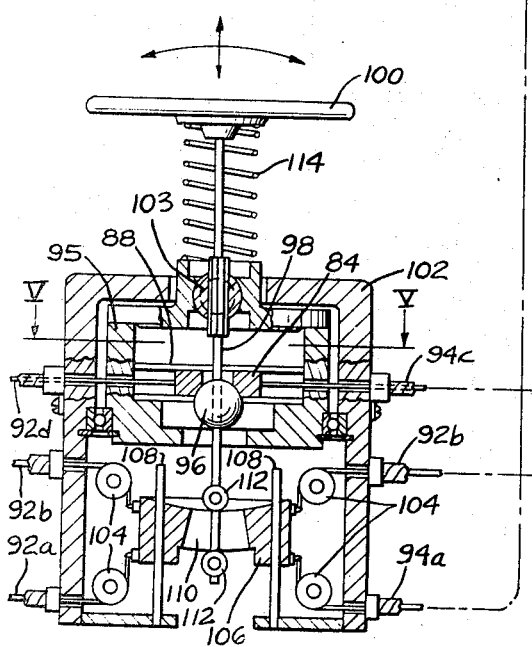
INVENTOR.
FREDERICK G. KRAFFT
BY United States Patent Office 3,420,473
Patented Jan. 7, 1969

3,420,473
POWERED AND STEERABLE LIGHTER-
THAN-AIR VEHICLE
Frederick G. Krafft, 2975 Fox Hollow Road,
Springfield, Ohio 45502
Filed Apr. 11, 1966, Ser. No. 541,718
U.S. Cl. 244—30      5 Claims
Int. Cl. B64b 1/62; B64b 1/26; B64b 1/36

This invention relates to aircraft and is particularly concerned with a buoyant, or lighter-than-air, type aircraft having power means for propelling and guiding the aircraft.

Buoyant, or lighter-than-air, aircraft are, of course, known and can take the form of balloons or blimps, or dirigibles or zeppelin type craft.

Of the various type of buoyant or lighter-than-air aircraft, only the blimp type, and the dirigible type have propelling means associated therewith. With these types of aircraft a body of gas, such as hydrogen or helium, is enclosed within a large enclosure which is either in the form of an unsupported bag, or a skin supported on a suitable framework, while a cabin is suspended therebeneath and propelling means, generally in the form of propeller type engines, are also supported beneath the gas enclosure. Aircraft of this nature are extremely expensive and are also quite large, but heretofore have been the only type of aircraft that can be classified as lighter-than-air and which have means by which they can be propelled and directed.

The advantage exists in connection with all lighter-than-air aircraft, however, that only a small amount of power is required for the propulsion thereof. With the conventional aircraft, in which the lift is developed by the velocity of the aircraft moving through the air, or by rotating air foils, a great amount of power must be expended in developing the lift necessary to get the aircraft into the air and to sustain it therein. The speed required for a conventional winged aircraft to make it airborne makes the aircraft quite expensive and also introduces extreme hazard at the time of takeoff and at the time of landing.

The most inexpensive type of aircraft is, of course, a balloon but such an aircraft is unpropelled and is unsteerable and is, thus, completely at the mercy of the air currents and the winds and, furthermore, it is not easy to control its elevation.

The present invention has as a particular object, the provision of an aircraft which falls into the lighter-than-air classification so that it will rise in the air without the use of power but which includes simple power means for propelling it and for guiding it while in flight and also for assisting in the ascent and descent of the aircraft.

Another object of this invention is the provision of a safe aircraft of the lighter-than-air class which, by the virtue of its shape, weight, structure, and internal pressure would not be vulnerable to the destructive forces of nature.

Another object of this invention is the provision of an extremely inexpensive aircraft of the lighter-than-air class and which can be propelled and guided at the will of the operator.

A still further object of the present invention is the provision of a lighter-than-air aircraft but in connection with which there is no thin easily torn gas containing skin and no objectionably heavy internal supporting framework within the gas compartment.

Another object of this invention is the provision of a lighter-than-air aircraft in which modern materials of construction are combined in such a manner as to provide a structure having an extremely high strength to weight ratio and which is rigid without internal pressure.

The foregoing objects as well as other objects and advantages of the present invention will become more apparent upon reference to the following detailed description taken in connection with the accompanying drawings, in which:

FIGURE 1 is a side view partly broken away of an aircraft constructed according to my invention;

FIGURE 2 is a sectional view indicated by line II—II on FIGURE 1;

FIGURE 3 is a sectional view indicated by III—III on FIGURE 2, but drawn at considerably enlarged scale;

FIGURE 4 is a somewhat schematic view showing the arrangement and construction of the steering and guiding device of the aircraft and the control therefor;

FIGURE 5 is a sectional view indicated by line V—V on FIGURE 4, showing the arrangement and construction of the manually operated portion of the control of FIGURE 4;

FIGURES 6 to 11 show diagrammatically how the aircraft is controlled in flight;

FIGURE 12 is a fragmentary view showing one type of shell for the aircraft; and

FIGURE 13 is a view like FIG. 12 but shows a different type of shell.

*General arrangement*

In general, the aircraft of the present invention comprises a rigid but thin walled and light enclosure which includes a main chamber which is preferably either highly evacuated or which contains only a small amount of an extremely light gas such as hydrogen or helium. The size of the said chamber, which can be called a gas chamber, is such that the volume of air displaced thereby will impart buoyancy to the craft so it will float in the air at a height predetermined to be the safe altitude of flight for such a craft.

The aircraft is preferably ball shaped. This shape for the aircraft permits the fullest development of the strength of the material and thereby permits the aircraft to be made with a relatively light weight skin or shell. This shape is also the least vulnerable to the destructive forces resulting from cross winds, up and down drafts, turbulence of air and other forces of nature likely to be encountered by aircraft. What is contemplated is the construction of the aircraft of a material consisting of glass fiber sealed with plastic, or conversely a glass fiber reinforced plastic material. The glass fiber may be applied in the form of wound filaments, or fabric, or could be sprayed in place in the form of short lengths.

It has been found that this material is extremely strong, can be made entirely fluid impervious, is relatively light and can readily be formed to the most complex shapes and, furthermore, that modifications and repairs and the like can be made therein after completion without in any way detracting from the strength of the structure. The material, of the aircraft, is rigid against stretching and collapsing so that the unrestrained aircraft will normally find its own height at which it will float and which, as will be seen, can be controlled by the operator.

Within the basic ball making up the aircraft is provided a compartment for a passenger or passengers and there is also provided means for propelling the aircraft in the form of an engine in an engine or main air tube which extends diametrally through the ball of the aircraft in the fore and aft direction. A relatively small engine can be employed for this purpose and the function of the engine is to cause air and/or gases to be discharged from the rear end of the tube and thereby exert a propulsive effort on the aircraft. An engine driven propeller is contemplated. Jet type engines, however, are also contemplated and would be quite practical. A turbojet engine, or a ramjet engine could be employed in the main air passage. With a jet engine, special baffling would protect the aircraft from the jet-heat and also assist in developing air flow through the tube.

It is also proposed that means be provided for developing directive jets at the sides of the aircraft and which jets are adjustable as to direction. Only a small amount of force is required for turning and directing the aircraft so that engines or motors used for this purpose could be quite small. The gas needed for such control jets could even be drawn from the discharge side of the main propulsion device, if desired. Small turbine driven blowers, however, are satisfactory for creating the directive jet.

The space within the aircraft which is not taken up by the passenger compartment and the main air passage, or engine tube, is, as mentioned before, in the form of a large chamber which is substantially evacuated but, which may contain a small amount of hydrogen or helium. Means are provided under the control of the operator of the aircraft for changing the volume of the main chamber of the aircraft and in this manner the buoyancy of the aircraft can be modified so that it can be caused to change its elevation. For example, the volume of the main chamber can be decreased to the point that the aircraft will decend to the ground whereupon it can be anchored thereto and then, by increasing the volume of the main chamber, the aircraft can be caused to ascend to a predetermined level for flight. The directive jet creating means are so arranged that they can be employed in a manner to assist in the ascent and descent of the aircraft.

The aforementioned large main chamber can be completely evacuated to make the craft buoyant or it can be completely or partially filled with a gas which is lighter than air such as helium or hydrogen. An advantageous arrangement is one wherein the chamber is at subatmospheric pressure so that with the shell of the aircraft designed to provide safe conditions at earth level, when the craft rises in the atmosphere, due to the buoyancy of the craft, the factor of safety of the shell against implosion due to the pressure of the atmosphere thereon will increase. If the craft were to rise high enough, this factor of safety would be reversed, if the space were partly pressurized, but it is intended that the stable level of the craft will be such that it will be operating under conditions well removed from those limits of pressure conditions at which implosion or explosion of the shell might occur.

*Detailed description*

Referring to the drawings somewhat more in detail, in FIGURE 1, 10 indicates the aircraft generally which will be seen to be in the form of a thin walled hollow sealed shell in the form of a large ball. An ellipsoidal or ovoidal shape for the aircraft is also contemplated, as well as the spherical shape illustrated. All such shapes are extremely strong. Curved spring legs to support the aircraft upright on the ground are provided at 12 on the bottom of the aircraft. These legs cushion the landing of the aircraft, and also, can be availed of to anchor the aircraft to the ground.

The lower portion of the aircraft is provided with a compartment 14, recessed into the bottom of the shell, for one or more passengers and this compartment has an access opening closed by the door 16. The compartment 14 may advantageously be closed by a glass or plastic sheet 18 or may otherwise be provided with openings so that the operator of the craft can observe the region outside the aircraft. The passenger compartment 14 in FIGURE 1 is recessed into and near the bottom of the aircraft and is provided with a domed upper wall 20.

It is the space 21 above wall 22 that is either evacuated or is completely or partially filled with hydrogen or helium gas. Extending through the space 21 from front to back of the craft is the main air passage or engine tube 23 which flares outwardly toward the front to an inlet opening 24 and flares outwardly toward the back to form a discharge opening 26.

Referring further to FIGURE 1, it will be observed that the main compartment 21 in the aircraft has a moveable wall portion 22 which is sealingly connected with wall 20 at the circumference thereof as by an annular bellows-like arrangement 24. The purpose of moveable wall 22 is to permit the volume of main chamber 21 to be changed at the will of the operator. To this end, the space 25 between walls 20 and 22, and inside annular sealing bellows 24, has a valve 27 connected thereto which can be opened to admit air thereto which would permit wall 22 to move upwardly and reduce the size of main chamber 21 and thereby reduce the buoyancy of the aircraft. A small high speed gas turbine operated air pump 28 is also connected to space 25, and when valve 27 is open, and the pump is actuated, air will be withdrawn from space 25 whereby wall 22 will move downwardly and increase the size of main chamber 25 and thereby increase the buoyancy of the aircraft.

The space 25 may, furthermore, be provided with a valved fitting 30 to which a water hose can be connected to supply water to the space to weight the aircraft when it is to be parked.

As will be seen in FIGURES 2 and 3, there is disposed within engine tube 23 the ramjet engine 38. Ramjet engine 38 has an open forward end 40 into which air is rammed by the movement of the aircraft and, into which air, fuel is supplied by nozzles 42 so that combustion occurs within chamber 44. As mentioned, other types of engines and gas moving means could be employed and the ramjet engine shown is, thus, merely exemplary.

The igniting devices and the like associated with such an engine have not been illustrated because these are conventional items. The discharge from the engine passes through nozzle 46 and is in the form of somewhat of a jet entering the throat of a venturi 48. Venturi 48 protects the wall of engine tube 23 from the hot blast from the engine and likewise induces flow of air through the engine tube in a manner well known in connection with venturis and jets.

The result of operating engine 44 is to cause movement of air in large volume longitudinally through main air passage or engine tube 23 from the front to the rear of the aircraft which will exert a propulsive effect on the aircraft in the forward direction. The rear end of tube 23 may advantageously carry a metal cladding 33, aluminum foil, for example, to reflect heat. This metal may be heavy enough to strengthen the craft and help sustain thermal stresses in the hot end of the engine tube.

The nozzles 42 may be supplied from a fuel source 50 via pump means 52 and fuel flow can be controlled in any of several known conventional manners.

I find it advisable to limit the maximum velocity of air through the engine and with this in mind, there is provided a plate 54 spaced outwardly from inlet opening 40 of the engine and under the bias of a spring 56. The plate 54 will yield toward inlet 40 and commence to restrict the inlet at a predetermined air velocity through the engine so that the operation of the engine is automatically controlled and the rate of gas flow therefrom will always be maintained below a predetermined maximum amount.

At each side of the aircraft there are provided wells or recesses 58 and in each well or recess is a turbine means comprising a rotor 60 and a stator 62. Fuel is supplied to rotor 60 via conduit 64 and combustion takes place in the stator near the periphery 66 of each rotor. As the rotors rotate, they draw air into the turbine means as indicated by arrow 68 and this air, which helps form the combustion gases, is discharged radially from the periphery of the turbine means.

FIGURE 4 shows that a control 70, tiltable in a support spider 72, supports each turbine means for tilting movement in its well so that the radial discharge from the turbine means can be confined to any selected peripheral range thereof whereby each turbine means can be caused to develop a directive jet which will impart a thrust on the aircraft to impel the aircraft in the forward or rearward direction or cause the aircraft to rotate on vertical axis, or cause the aircraft to be urged vertically, either upwardly or downwardly.

As will be seen in FIGURE 4, at the top of each turbine means is connected a push-pull wire 92a having a sheath 94a. Wire 92b with a sheath 94b is connected to the bottom of each turbine means. Similarly, wires 92c and 92d with sheaths 94c and 94d, respectively, are connected to the front and rear sides of the turbine means. Front and rear in this connection means toward the front and rear of the aircraft, respectively.

By controlling these wires, the turbine means can be tilted to direct the control jets therefrom in any desired direction. If both control jets are directed upwardly, or downwardly, or forwardly, or rearwardly, the aircraft is thrust thereby in the opposite direction. If one control jet is directed forwardly and the other rearwardly, the aircraft is caused to rotate in one direction or the other on a vertical axis.

The sheaths of the wires are anchored at their ends adjacent the turbine means in any suitable conventional manner and the wires and their sheaths lead to a control station in the operators compartment 14. As shown, each wire is sealed in its respective well by a boot or bellows 96 and this permits the cables to be led through the main compartment without any danger of leakage.

The control station comprises a slide 84 which is moveable in guide 88 in a support frame 95 in respectively opposite directions. Slide 84 is captive on a ball 96 carried by a lever 98 having wheel 100 at the top and tiltably supported in frame 95 by pivot shaft 103.

It will be apparent that tilting movement of wheel 100 in the fore or aft direction will be accompanied by movement of ball 96 in the opposite direction which, in turn, will be accompanied by movement of slide 84. Wires 92c and 92d for the turbines on opposite sides of the craft are connected to slide 84 as will be seen in FIGS. 4 and 5 so that movement of slide 84 will be transmitted through the push-pull wires 92c, 92d to the turbine means 54 on opposite sides of the aircraft.

The ends of wires sheaths 94c and 94d are anchored on a stationary frame 102 in which frame 95 is rotatable. When wheel 100 is tilted forwardly, slide 84 moves to the left in FIG. 5 and this will pull on wires 92c and tilt the turbines about vertical axes to cause their jets to discharge toward the rear and thereby propel the aircraft in the forward direction. When the wheel is tilted backwardly, the opposite effect is obtained. Such forward and rearward propulsion of the aircraft by the small directive jets might be necessary during take off and landing of the aircraft, particularly while the main motor is idle. In forward flight, the turbines can be shut down or can be left on for control purpose.

Upon rotation of wheel 100, frame 95 is rotated in frame 102 by shaft 103 and, at this time, one of wires 92c is pulled out of its sheath and the other is pushed into its sheath. The same occurs in connection with wires 92d and the turbines are thus rotated about their respective vertical axes in the same sense so that one jet discharges forwardly and the other rearwardly thereby developing a rotative torque on the aircraft which will turn it on its vertical axis. As will be seen in FIGS. 4 and 5, when frame 95 turns clockwise, the turbines will be tilted to develop a clockwise torque on the aircraft and when the frame 95 is rotated in the opposite direction, the torque on the aircraft is in the opposite direction. The rotating movement of frame 95 needs only be a few degrees on each side of a neutral position.

The sheaths 94a and 94b lead from the respective wells to stationary anchor points on frame 102 and the wires 92a and 92b therein pass over pulleys 104 in frame 102 and lead to block 106 on which the wires are anchored. Block 106 is guided on rods 108 and when it moves downwardly, the turbines tilt out at the top and direct their jets upwardly and thrust the aircraft downwardly. When block 106 moves upwardly, the turbines tilt out at the bottom and the craft is thrust upwardly.

Block 106 has a slot 110 into which lever 98 extends. Balls 112 on lever 98 engage curved surfaces on opposite sides of block 106 so that vertical movement of the block can be had by vertical movement of lever 98 by wheel 100, while tilting of the lever will not move the block. Lever 98, is of course, fixed to balls 112 but is slidable in ball 96, and is slidably splined to shaft 103. A spring 114 normally holds wheel 100, lever 98 and block 106 in a predetermined vertical position and permits easy vertical movement of the wheel.

The several operative positions of the turbines are shown in FIGS. 6 to 11. These views are schematic plan views of the aircraft and show; in FIGS. 6 and 7, torque exerted on the aircraft; in FIGS. 8 and 9 vertical thrust; and in FIGS. 10 and 11, backward and forward thrust.

FIG. 12 shows a fragment of the shell of the aircraft showing how the shell 120 could carry internal stiffening ribs 122 in a sort of waffle pattern. This construction is extremely strong but is quite light in weight.

FIG. 13 shows a fragment wherein a thin outer shell 124 has thereon a foam layer 126. This construction is also light weight and strong.

The shell can be reinforced whenever necessary by added material in the form of ribs, thickened sections, or metal imbedded in the shell or applied as internal or external cladding.

The directional turbine wells are preferably lined with a metal sheet, or may be entirely metal, if so desired, or if convenient, for reasons of ease of fabrication. The turbines, in a neutral position, have their peripheral jet discharging regions about half buried in their respective wells. When a turbine is tilted, a differential effect is obtained with the discharge from the turbine on the tilted inside reducing while simultaneously, the discharge from the outside of the turbine increases. The gases prevented from leaving the tilted inside, furthermore, tend to add to the gases from the tilted outside so that small tilting movement of the turbines produce pronounced quick changes in the direction of the jets therefrom. Control of the craft is thus easy because small easy movements of the control lever are all that is required to produce pronounced control forces so that the craft responds quickly to movements of the control lever.

What is claimed is:

1. An aircraft comprising: a rigid thin walled sealed hollow shell of substantially spherical shape defining a main chamber, said aircraft being buoyant in the atmosphere when said chamber is partially evacuated, a passageway extending through said shell in the fore and aft direction and open to the atmosphere at its opposite ends and having flared out entrance and exit ends, propelling means in said passageway for propelling a jet of gas through said passageway toward and out of the rear end thereof to exert a forward thrust on said aircraft, first and second means carried on said shell at respectively opposite sides thereof and operable for developing directional jets of gas directed substantially tangential to said shell for control of said aircraft, control means connected to said first and second means for control thereof in unison for controlling the direction of discharge of said directional jets from said first and second means, means recessed into the bottom of said shell forming a passenger compartment for the aircraft, an auxiliary chamber in said main chamber and sealed off therefrom and expansible and contractable for varying the effective size of said main chamber to vary the buoyancy of the aircraft in the atmosphere, said control means including control elements in said passenger compartment for control by an operator therein, and means in said passenger compartment for selectively controlling the expansion and contraction of said auxiliary chamber.

2. An aircraft according to claim 1 in which said shell is in the form of a glass fiber-plastic material and is free of internal support, and said passageway is located substantially on a diameter of said shell.

3. An aircraft according to claim 2 in which said first and second means are in the form of radial discharge gas turbine means, recesses formed into the sides of said shell in which said turbine means are mounted, and means engaging each turbine means in about the center thereof and tiltably supporting the turbine means in their respective recesses.

4. An aircraft according to claim 3 in which each said turbine means has a neutral position in its respective recess in which a first axial portion of the periphery thereof is inside the recess and a second axial portion of the periphery thereof is outside the recess so that the discharge from the turbine means is distributed uniformly about said second portion of the periphery thereof and whereby upon tilting of a turbine means in its recess the discharge therefrom is decreased at the tilted-in region of the periphery thereof and simultaneously increased at the tilted-out region thereof, said control means comprising cables connected at one end to said control elements in said passenger compartment and connected at the other end to circumferentially spaced points on said turbine means and providing for selective tilting of the turbine means on the one hand in respectively opposite directions about vertical and horizontal axes and on the other hand in the same direction about vertical axes.

5. An aircraft according to claim 4 in which said control elements include a control wheel actuated mechanism connected to said cables and operable upon downward movement of said wheel to actuate said cables so as to tilt said turbine means outwardly at the top thereof and to upward movement of said wheel to actuate the cables so as to tilt said turbine means outwardly at the bottom thereof and to fore and aft movement of said wheel to actuate said cables so as to tilt said turbine means outwardly at the back and front respectively thereof and to rotary movement of said wheel to actuate said cables so as to tilt said turbine means so that one tilts outwardly at the front thereof while the other tilts outwardly at the back thereof.

References Cited

UNITED STATES PATENTS

| | | | |
|---|---|---|---|
| 855,945 | 6/1907 | Gruber | 244—29 |
| 1,290,979 | 1/1919 | Griffith | 244—97 |
| 2,094,619 | 10/1937 | Reichert et al. | 244—97 |
| 2,475,786 | 7/1949 | Jordan | 244—30 |
| 2,728,702 | 12/1955 | Simon et al. | 244—126 |
| 2,943,822 | 7/1960 | Hamilton. | |
| 3,082,979 | 3/1963 | Hendrick. | |
| 3,227,400 | 1/1966 | Stahmer | 244—29 |
| 3,277,724 | 10/1966 | Lundeberg | 244—1 |
| 3,295,789 | 1/1967 | Hill | 244—1 |

MILTON BUCHLER, *Primary Examiner.*

T. MAJOR, *Assistant Examiner.*

U.S. Cl. X.R.

244—96, 97